(12) United States Patent
LaMantia et al.

(10) Patent No.: US 11,835,176 B2
(45) Date of Patent: Dec. 5, 2023

(54) LUBRICATING SYSTEM

(71) Applicants: Raymond LaMantia, Rockford, IL (US); Jeffrey LaMantia, Loves Park, IL (US)

(72) Inventors: Raymond LaMantia, Rockford, IL (US); Jeffrey LaMantia, Loves Park, IL (US)

(73) Assignee: LSP Industries, Inc., Rockford, IL (US)

( * ) Notice: Subject to any disclaimer, the term of this patent is extended or adjusted under 35 U.S.C. 154(b) by 481 days.

(21) Appl. No.: 17/176,764

(22) Filed: Feb. 16, 2021

(65) Prior Publication Data

US 2022/0003359 A1 Jan. 6, 2022

Related U.S. Application Data

(60) Provisional application No. 63/047,529, filed on Jul. 2, 2020.

(51) Int. Cl.
| | | |
|---|---|---|
| *F16N 13/22* | (2006.01) | |
| *F16N 21/00* | (2006.01) | |
| *F16N 25/02* | (2006.01) | |
| *F16K 31/02* | (2006.01) | |

(52) U.S. Cl.
CPC .............. *F16N 13/22* (2013.01); *F16K 31/02* (2013.01); *F16N 21/00* (2013.01); *F16N 25/02* (2013.01)

(58) Field of Classification Search
CPC ...... F16H 57/0458; F16H 57/046; F16N 7/32; B05B 7/0416
See application file for complete search history.

(56) References Cited

U.S. PATENT DOCUMENTS

| | | | | |
|---|---|---|---|---|
| 3,481,431 A | * | 12/1969 | Dorsey | D04B 35/28 239/338 |
| 3,888,420 A | * | 6/1975 | Boelkins | B05B 7/1272 184/7.4 |
| 5,154,259 A | * | 10/1992 | Magome | D04B 35/28 184/7.4 |
| 5,524,729 A | * | 6/1996 | Boelkins | F16N 13/16 239/602 |
| 7,975,805 B2 | * | 7/2011 | Wech | F16N 17/04 184/104.1 |

(Continued)

*Primary Examiner* — Minh Truong
*Assistant Examiner* — Mark K Buse
(74) *Attorney, Agent, or Firm* — Reinhart Boerner Van Deuren P.C.

(57) ABSTRACT

A lubricating system that includes a manifold with one or more manifold ports that permit a flow of lubricant through the manifold. The manifold is configured for removable attachment to another manifold such that any number of manifold can be joined together. An ejector is removably attached to the manifold. The ejector has one or more projections configured for insertion into each of the one or more manifold ports in the manifold, such that the ejector is configured to receive the flow of lubricant from the manifold, via the one or more projections, and to discharge lubricant periodically, or at preset intervals, from one or more outlet ports of the ejector. A locking key is disposed between the manifold and ejector. The locking key is configured such that movement of the locking key attaches or detaches the ejector from the manifold.

22 Claims, 12 Drawing Sheets

(56) References Cited

U.S. PATENT DOCUMENTS

| | | | |
|---|---|---|---|
| 2002/0144865 A1* | 10/2002 | Clancy | F16N 7/32 |
| | | | 184/55.1 |
| 2006/0231341 A1* | 10/2006 | Wech | F16N 7/32 |
| | | | 184/6.22 |
| 2009/0193965 A1* | 8/2009 | Paluncic | F16N 25/02 |
| | | | 251/324 |
| 2011/0036422 A1* | 2/2011 | Hanley | F16K 27/0209 |
| | | | 137/511 |
| 2011/0120802 A1* | 5/2011 | Divisi | F16N 25/02 |
| | | | 184/6.26 |
| 2013/0092475 A1* | 4/2013 | Arens | F16N 27/00 |
| | | | 184/7.4 |
| 2016/0167076 A1* | 6/2016 | Fehr | B29B 7/7404 |
| | | | 137/15.05 |

* cited by examiner

LUBRICATING SYSTEM

CROSS-REFERENCE TO RELATED PATENT APPLICATIONS

This patent application claims the benefit of U.S. Provisional Patent Application No. 63/047,529, filed Jul. 2, 2020, the entire teachings and disclosure of which are incorporated herein by reference thereto.

FIELD OF THE INVENTION

This invention generally relates to lubricating assemblies and components therefor.

BACKGROUND OF THE INVENTION

Embodiments of the present invention represent an advancement to the state of the art with respect to lubricating assemblies. These and other advantages of the invention, as well as additional inventive features, will be apparent from the description of the invention provided herein.

BRIEF SUMMARY OF THE INVENTION

In one aspect, embodiments of the invention provide a lubricating system that includes a manifold with a manifold port that permits a flow of lubricant through the manifold. The manifold is configured for removable attachment to another manifold such that any number of manifold can be joined together. An ejector is removably attached to the manifold. The ejector has a projection configured for insertion into the manifold port in the manifold, such that the ejector is configured to receive the flow of lubricant from the manifold, via the projection, and to discharge lubricant periodically, or at preset intervals, from one or more outlet ports of the ejector. A locking key is disposed between the manifold and ejector. The locking key is configured such that movement of the locking key attaches or detaches the ejector from the manifold.

In a particular embodiment, the manifold includes a plurality of threaded and non-threaded openings for attachment to other manifolds. The lubricating system may further include a plurality of attached manifolds wherein each of the plurality of manifolds has a removably attached ejector. In some embodiments, each of the plurality of attached manifolds is attached directly to an adjacent manifold in a side-by-side configuration. In alternate embodiments, each of the plurality of attached manifolds is attached to an adjacent manifold via one or more tubes configured to facilitate movement of the lubricant or air between attached manifolds, such that the manifolds may be spaced apart from adjacent manifolds.

In a particular embodiment, the manifold includes a key opening configured for insertion of the locking key. The projection may include a groove or notch, such that a portion of the locking key fits within the groove or notch, to attach the ejector to the manifold, when the locking key is inserted into the key opening.

In certain embodiments, the one or more outlet ports are each configured to connect to a nozzle, or to a hose that connects to the nozzle which is configured to dispense the lubricant. The ejector may include a bleeder valve to bleed air from the ejector. Additionally, the ejector may include a volume control to increase or decrease an amount of lubricant discharged by the ejector. Further, the ejector may include a velocity control to increase or decrease a rate of lubricant flow from the ejector.

In certain embodiments, the manifold includes an air inlet port configured to receive air to operate the ejector, and a fluid inlet port configured to receive lubricant to be supplied to the ejector. The lubricating system may also include an air valve for controlling a flow of pressurized air into the air inlet port of the manifold, and an actuator for operating the air valve. The actuator may be a mechanical actuator or an electronic timer actuator. In other embodiments, the lubricating system has a solenoid valve for controlling a flow of pressurized air into the air inlet port of the manifold.

In other embodiments, the lubricating system includes a reservoir for the lubricant, the reservoir having a reservoir outlet from which lubricant is supplied to one or more manifolds. The reservoir outlet may include a male quick-disconnect coupling that automatically opens upon insertion into a mating female quick-disconnect coupling, and automatically seals upon removal from from the mating female quick-disconnect coupling. In some embodiments, the reservoir is configured for attachment to a frame designed to support one or more manifolds, their removably attached ejectors, and one or more solenoid valves. The frame may have the female quick-disconnect coupling and a conduit for carrying the lubricant from the female quick-disconnect coupling to the one or more manifolds supported by the frame.

The lubricating system may further include a pump coupled between the reservoir and manifold, the pump configured to increase the flow rate of lubricant from the reservoir to the manifold. In some embodiments, the lubricating system includes an electronic controller configured to control an electronic timer actuator, or operation of a solenoid valve. The electronic controller may be configured for connection to a proximity sensor wherein the electronic controller operates the solenoid valve based on data received from the proximity sensor. The electronic controller may also be configured to store, in memory, operating parameters for a plurality of different programs that control operation of the lubricating system. In certain embodiments, the electronic controller includes a counter which counts the number of operating cycles for a machine enabling the electronic controller to activate the ejector to dispense lubricant on a particular operating cycle of the machine.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

The accompanying figures show multiple configurations of lubricating assemblies and various components thereof, constructed in accordance with embodiments of the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
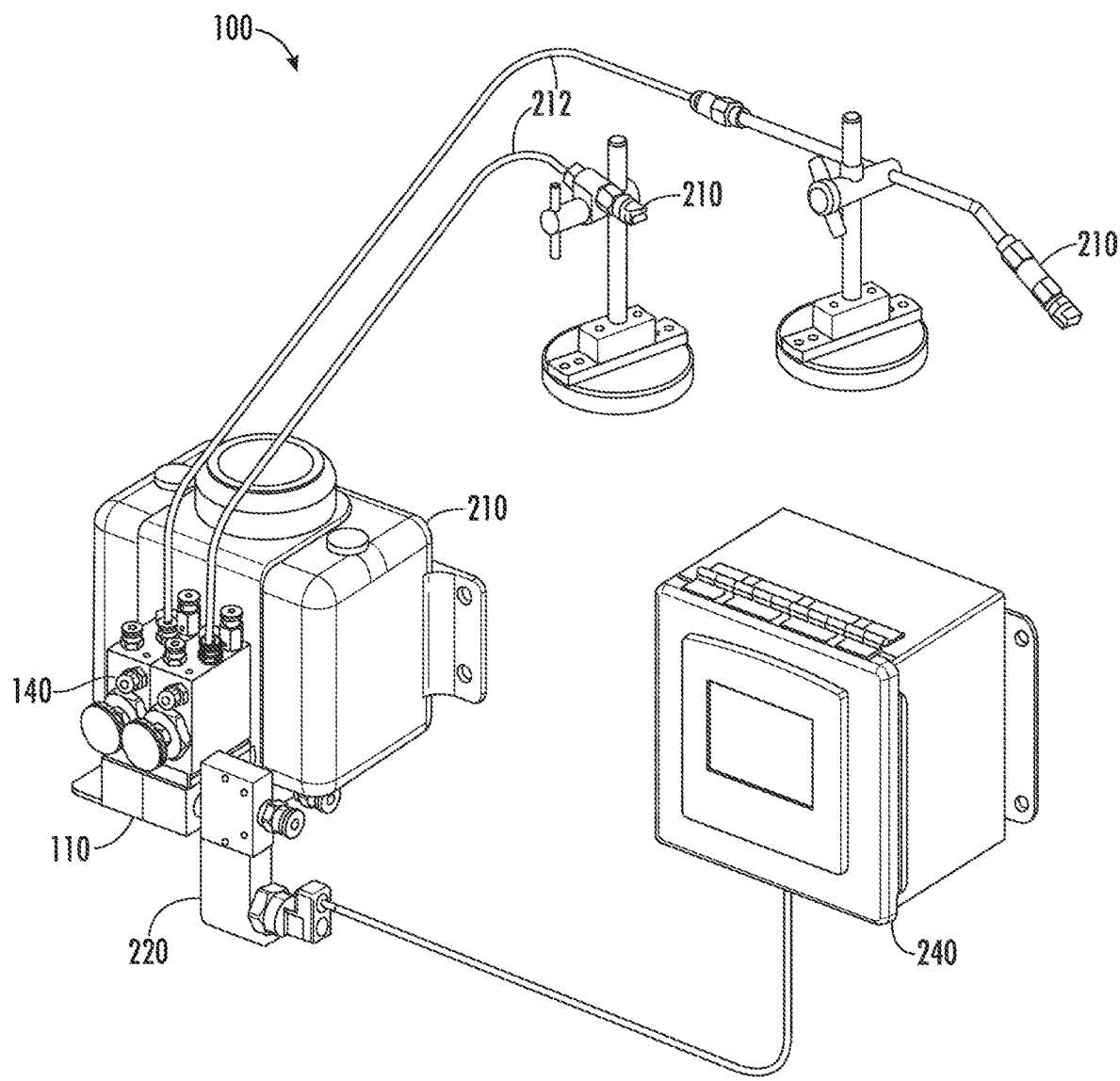
FIG. 1 is a perspective view of a lubricating system constructed in accordance with an embodiment of the invention.

FIG. 1 is a perspective view of a lubricating system 100 constructed in accordance with an embodiment of the invention. The lubricating system 100 includes a pair of manifolds 110 with an attached pair of ejectors 140. Lubricant stored in the reservoir 180 is supplied to the manifolds 110 and discharged from the ejectors 140. The lubricant is finally dispensed from nozzles 210 which are coupled to the ejectors 140 via hoses 212. In the embodiment of FIG. 1, air being supplied to the manifolds 110 is regulated by solenoid valves 220 whose operation is controlled by an electronic controller 240.

Figure 2A:
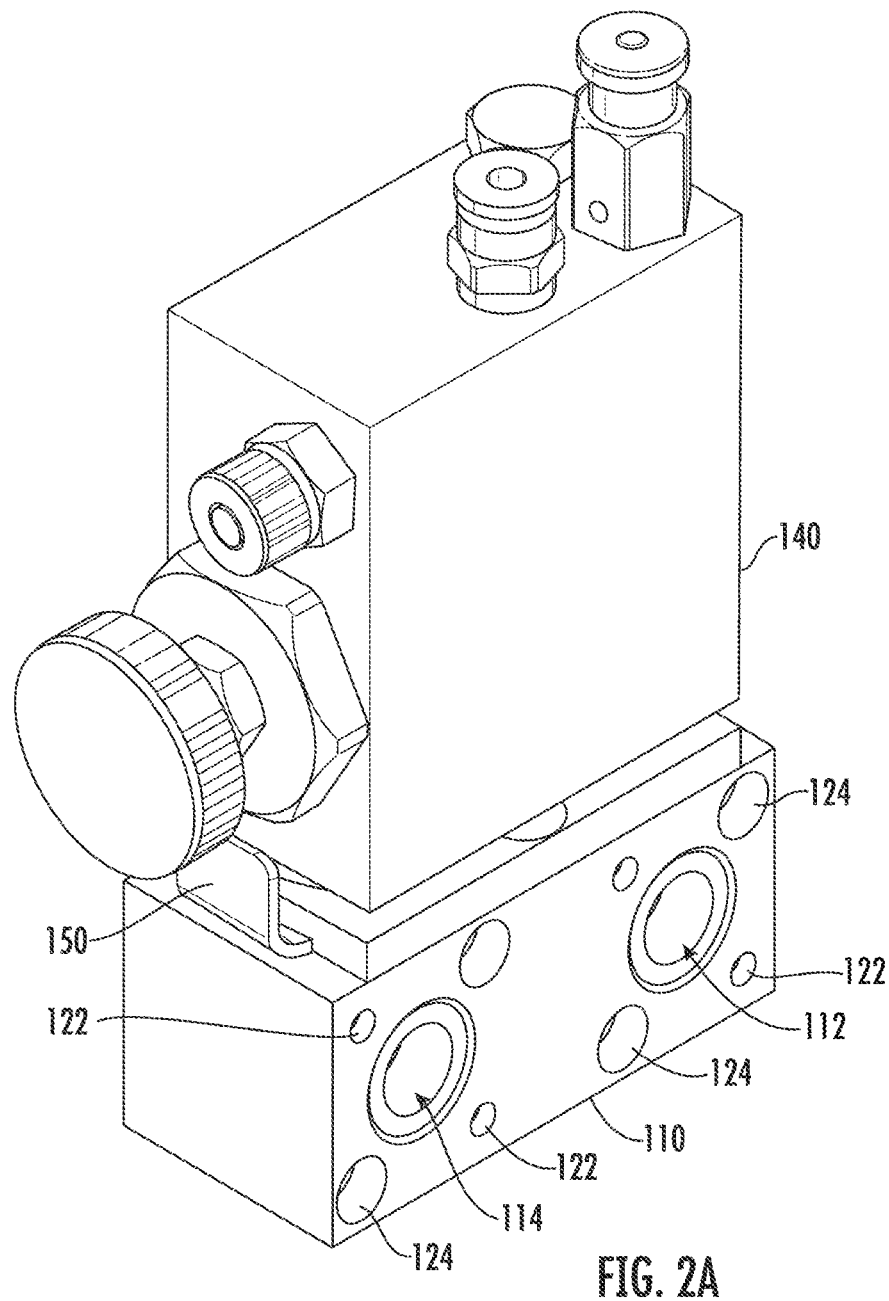
FIGS. 2A and 2B are perspective views of a manifold and ejector assembly used in the lubricating system of FIG. 1, in accordance with two embodiments of the invention.
Figure 2B:
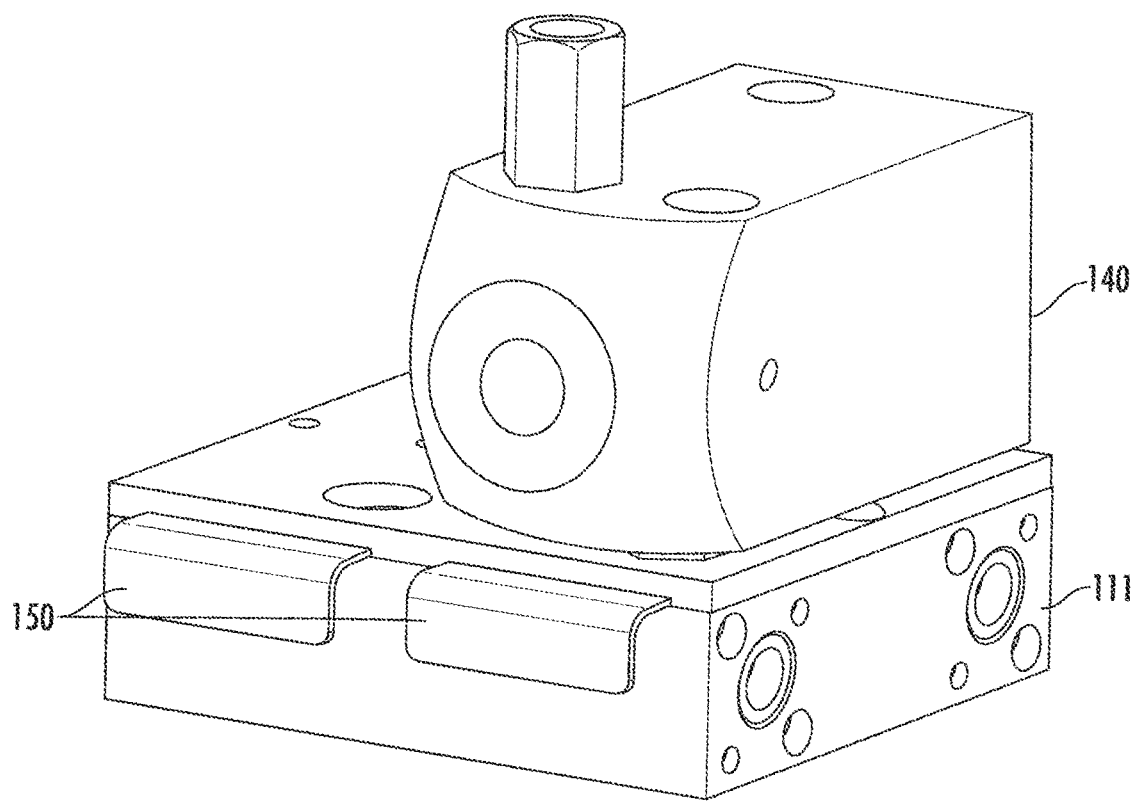
Figure 3:
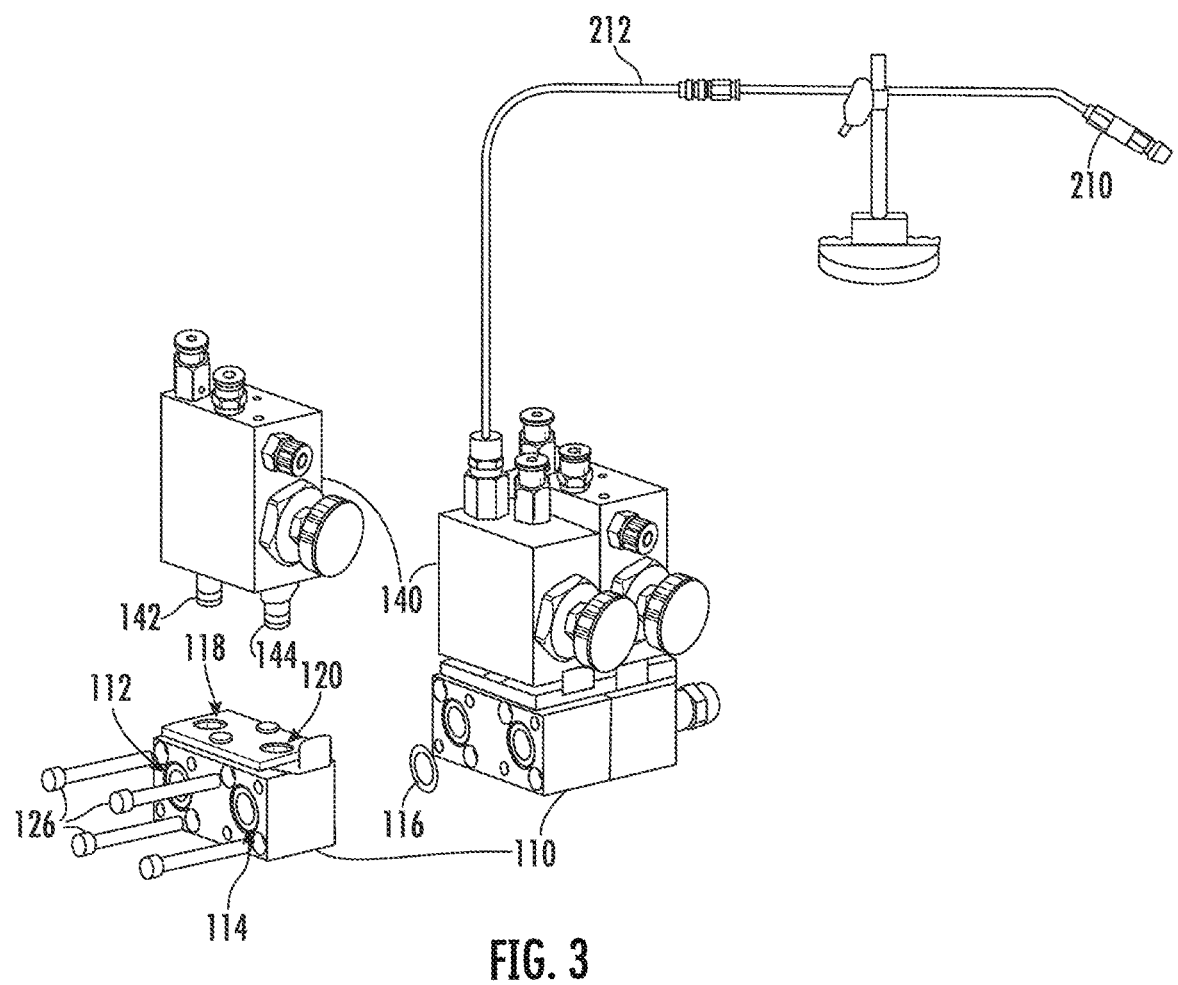
FIG. 3 is a perspective view of a multiple-manifold-and-ejector assembly which could be used in the lubricating system of FIG. 1, in accordance with an embodiment of the invention.
Figure 4:
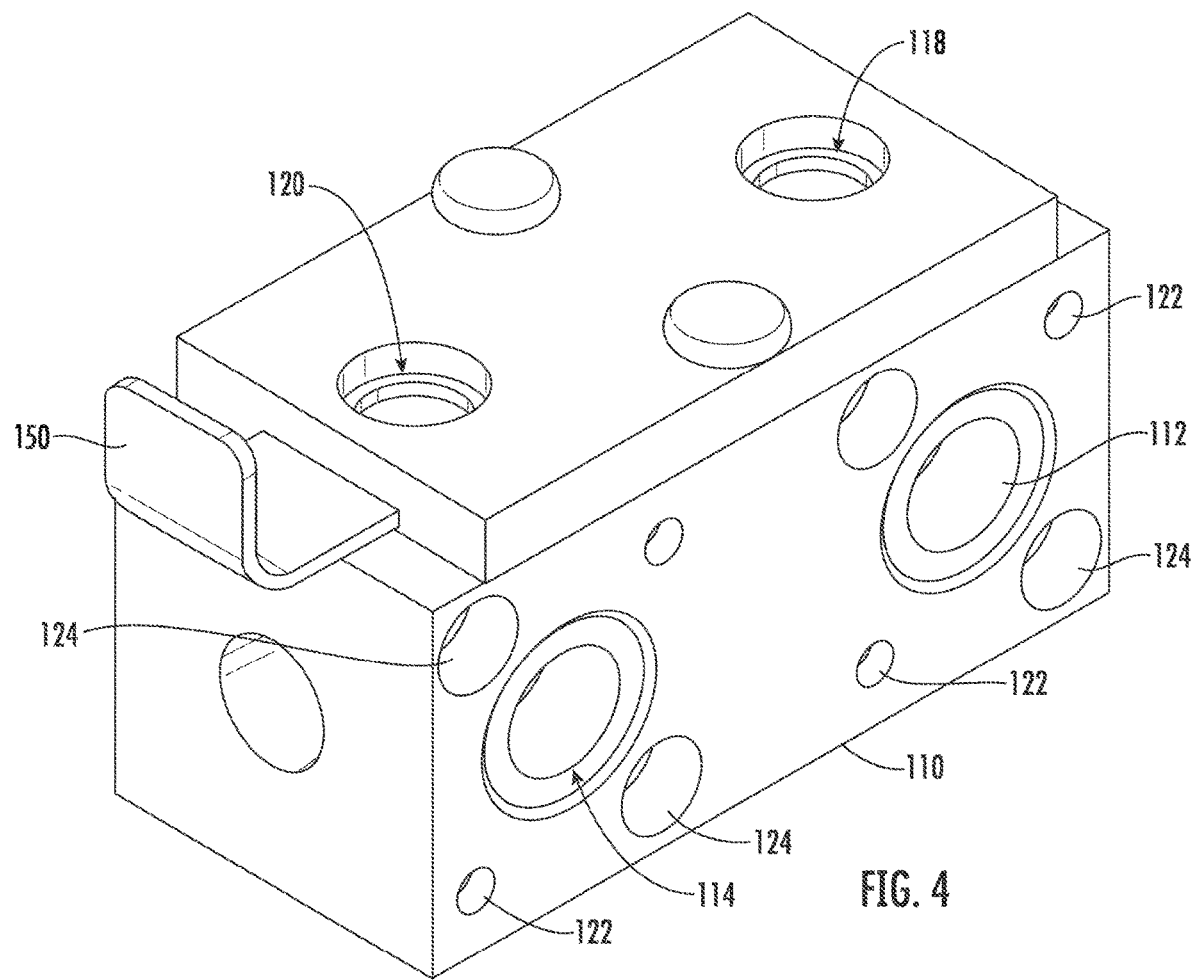
FIG. 4 is a perspective view of the manifold and locking key, in accordance with an embodiment of the invention.

FIGS. 2A-4 provide perspective views of the manifold 110 and ejector 140 assembly along with the locking key 150. FIG. 2A shows a single manifold 110 attached to an ejector 140 via the locking key 150 inserted into an opening in the manifold 110. As shown in FIG. 2A, the manifold 110 includes an air inlet port 112 and a fluid inlet port 114. In the embodiments of FIGS. 2-4, the air inlet port 112 and the fluid inlet port 114 extend through the manifold 110 from one side to the other. In these embodiments, both the air inlet port 112 and the fluid inlet port 114 also extend in a perpendicular direction to through a top side of the manifold 110 to create an air outlet port 118 and a fluid outlet port 120, as can be seen in FIG. 3. The manifold 110 is configured for removable attachment to another manifold 110 such that any number of manifold 110 can be joined together.

In particular embodiments of the invention, such as illustrated in FIG. 2B, a manifold 111 may be configured for the removable attachment of more than one ejector 140. Manifold 111 can accommodate two ejectors 140 and can hold two locking keys 150 for their individual attachment or detachment.

Figure 13:
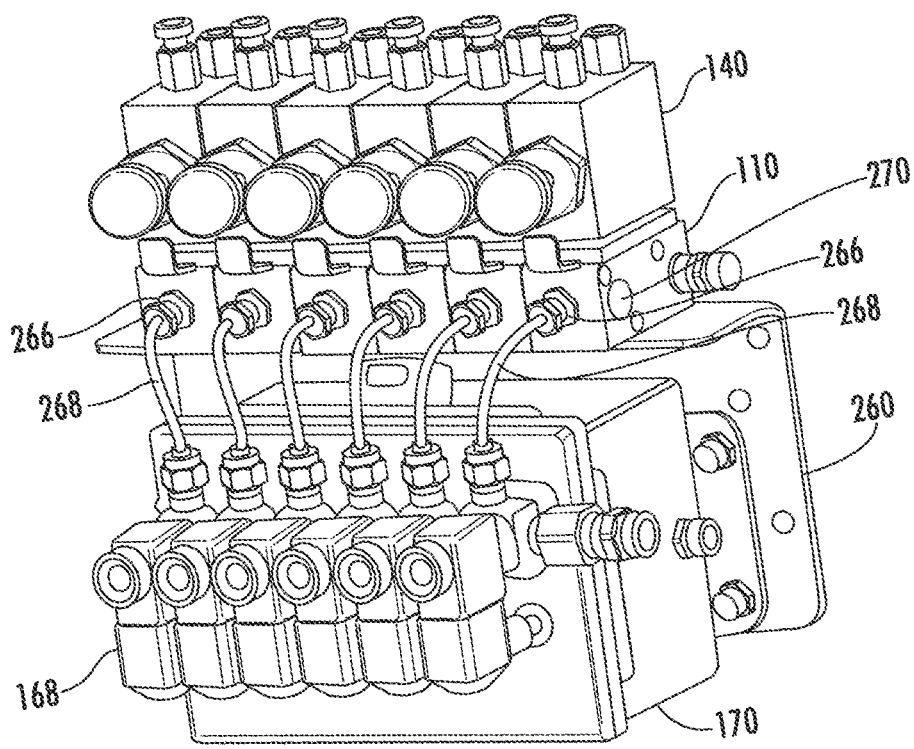
FIG. 13 is a perspective view of a frame assembled to multiple solenoids, manifolds and ejectors, in accordance with an embodiment of the invention.

Depending on the application and design of the lubricating system, it may be necessary to cover one or both air inlet ports 112. For example, the last manifold 110, in a row of adjacent manifolds 110, would need a cover for the air inlet port 112 and the fluid inlet port 114 on the exposed end of the manifold to prevent the compressed air and lubricant from escaping or running out of the assembly. A cover (not shown) designed for quick, air-tight assembly to the manifold is envisioned. Alternatively, as illustrated in FIG. 13, manifolds 110 that are actuated via solenoid valves 168 may have an air inlet port 266 in which case both of the air inlet ports 112 would be covered.

FIG. 3 shows how multiple manifolds 110 can be attached in a side-by-side configuration. When attached in such a manner, the air inlet ports 112 of adjacent manifolds 110 are aligned, as are the fluid inlet ports 114 of adjacent manifolds 110. To prevent leakage, O-rings 116 may be placed at the air inlet ports 112 and at the fluid inlet ports 114 between adjacent manifolds 110. In the embodiment shown, the block-shaped manifold 110 has multiple threaded openings 122 and multiple non-threaded openings 124. As shown, bolts 126 may be inserted through the non-threaded openings 124 of a first manifold 110 and into the threaded openings 122 of a second manifold 110 to attach the two manifolds 110. In this manner, any number of manifolds 110 can be attached in the side-by-side configuration shown in FIG. 3. Each of the attached manifolds 110 may have an attached ejector 140.

The ejector 140 has an air inlet projection 142 and a fluid inlet projection 144 on a bottom side of the ejector 140. The air inlet projection 142 is configured for insertion into the air outlet port 118 of the manifold, while the fluid inlet projection 144 is configured for insertion into the fluid outlet port 120. An embodiment of the invention is envisioned in which the manifold 110 has only the fluid outlet port 120 and the mating ejector 140 has only the fluid inlet projection 144.

FIG. 4 shows an embodiment of the locking key 150 used to attach the ejector 140 to the manifold 110. The locking key 150 is configured such that movement of the locking key 150 attaches or detaches the ejector 140 from the manifold 110. In this embodiment, the manifold 110 includes a top portion 128 with an opening 130 into which the locking key 150 is inserted to attach the ejector 140 to the manifold 110. In a particular embodiment, the locking key 150 is slotted so as not to block the air outlet port 118 or the fluid outlet port 120. However, the slotted portion of the locking key 150 is also configured to fit within a notch or groove in the air inlet projection 142 and fluid inlet projection 144 when the manifold 110 is assembled to the ejector 140.

The ejector 140 also includes an outlet port 146 through which lubricant is discharged. The outlet port 146 is configured for connection to the nozzle 210, or to a hose that connects to the nozzle 210 which dispenses the lubricant. The embodiment shown includes a bleeder valve 148 to bleed air from the ejector 140, along with a volume control 150 for controlling the amount of lubricant discharged. The volume control 150 may be in the form of a rotary knob though other types of mechanical controls are contemplated. An air velocity control 152, which could also be in the form of a rotary knob, controls the rate at which lubricant is discharged from the outlet port 146.

In a particular embodiment of the invention, the air velocity control 152 is a needle valve mounted on the air inlet port 112 of the ejector 140. The needle valve regulates how fast air can get into the ejector 140 to push a piston forward. This allows the ejector 140 to give either an "explosive" hard misty spray of a soft wet spray with very low mist or spray bounce. In some embodiments, the needle valve screws into the air inlet port 112 of the ejector 140. Adjusting the needle valve regulates how fast and how much volume of air can get into the air portion of the ejector 140 to push the piston forward. For example, the more the volume and speed of air is reduced, the slower the piston will move thus regulating (or reducing in this instance) how fast the lubricant mist will be expelled by the ejector 140.

In another particular embodiment, the volume control 150 is a thumbscrew that sets the precise amount of lubricant to be ejected from the ejector 140. Lubricant fills a barrel inside of the ejector 140 and then a piston moves forward to push the fluid out of the ejector 140 to the nozzle 210. If the thumbscrew is fully opened, the entire amount of lubricant will be evacuated from the ejector barrel. If the thumbscrew is closed down, the amount of fluid that accumulates in the barrel is reduced, thus reducing the volume of lubricant that will be sprayed out of the ejector 140.

Figure 5:
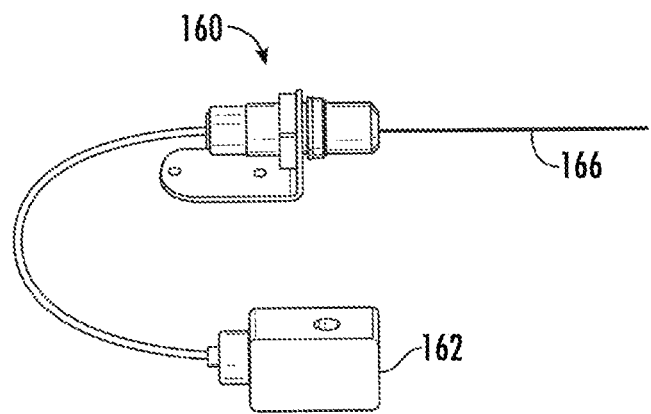
FIG. 5 is a perspective view of a mechanical actuator according to an embodiment of the invention.
Figure 6:
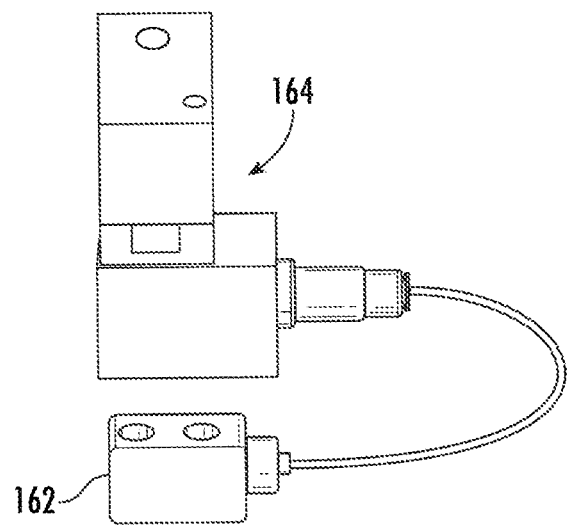
FIG. 6 is a perspective view of an electronic timer actuator in accordance with an embodiment of the invention.

In particular embodiments, the air provided to the ejector 140, via the manifold 110, is not dispensed with the spray of lubricant, but instead provides the mechanical force used to expel the lubricant from the ejector 140 and, in turn, from the nozzle 210. An actuator is used to regulate a flow of compressed, pressurized air into the manifold 110 and ejector 140. FIGS. 5 and 6 show two types of actuators. FIG. 5 is a perspective view of a mechanical actuator 160 coupled to an air valve 162. When moved, a trip wand 166 on the mechanical actuator 160 opens the air valve 162 allowing air into the manifold 110 and ejector 140 causing lubricant to be dispensed from the nozzle 210. FIG. 6 is a perspective view of an electronic timer actuator 164 coupled to the air valve 162. The electronic timer actuator 164 is configured to generate a periodic signal to open the air valve 162 at predetermined intervals.

Figure 7:
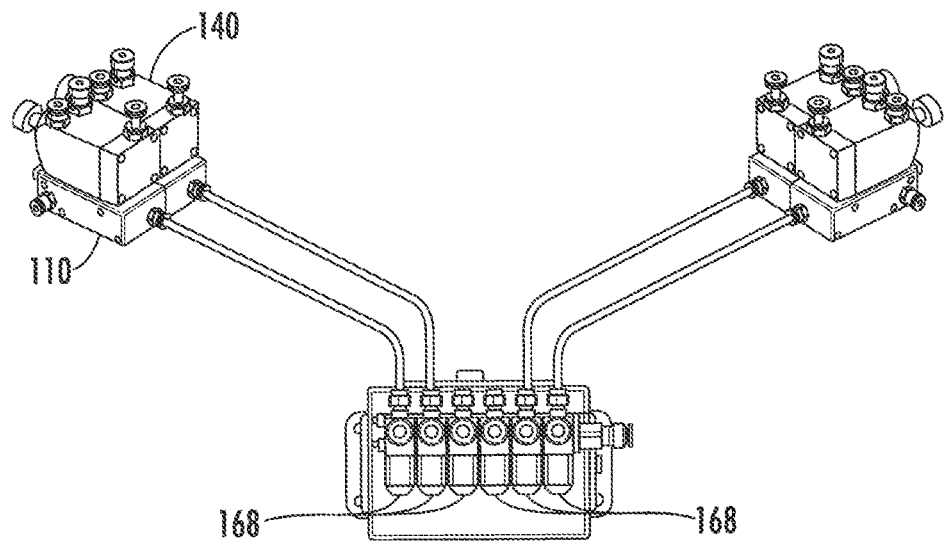
FIG. 7 is a perspective view of a solenoid valve actuators coupled to a plurality of manifold/ejector assemblies, in accordance with an embodiment of the invention.
Figure 8:
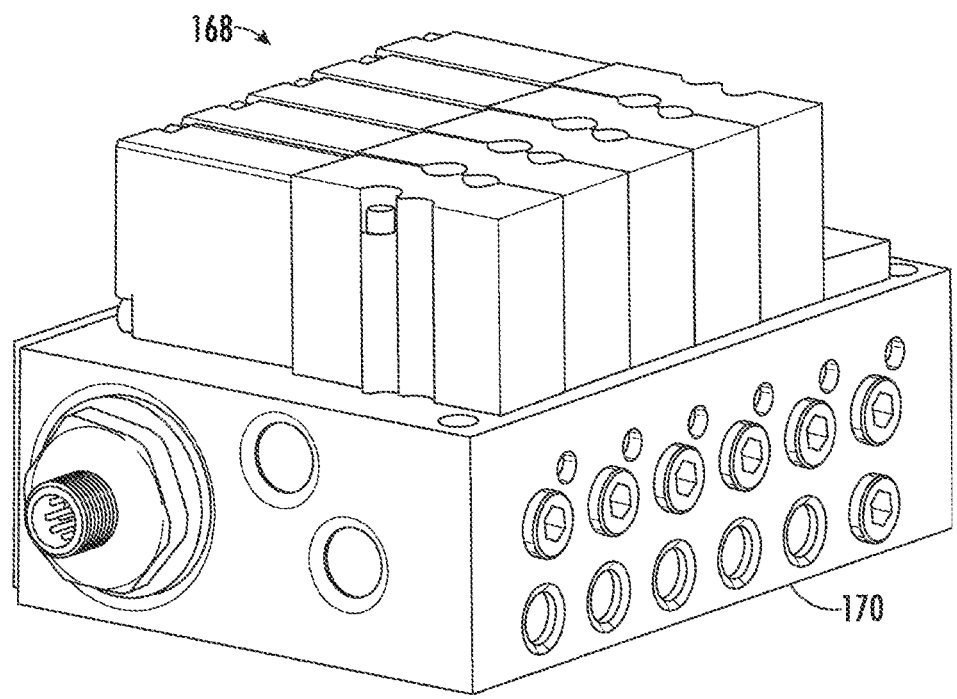
FIG. 8 is a perspective view of a bank of solenoid valve actuators with a junction box, in accordance with an embodiment of the invention.

Another type of actuator is a solenoid valve. Both FIGS. 7 and 8 show a bank of multiple adjacent solenoid valves 168 in which each solenoid valve 168 is coupled to a manifold 110/ejector 140 assembly. By connecting each manifold 110/ejector 140 assembly to its own solenoid valve 168, the user is able to control the operation of each ejector 140 independently, allowing for the spraying of lubricant by different ejectors 140 at different times, at different rates, in different amounts, and in different locations.

In those embodiments where one mechanical actuator 160, or one electronic timer actuator 164, controls the flow of pressurized air into multiple attached manifolds 110, each of the ejectors operates at the same time because the flow of pressurized air is roughly the same for each manifold 110. While there could be some variation in flow rate and flow volume based on how the ejector controls are set, or in location depending on the hoses and nozzles 210 attached to the ejector outlet port 146, each of the ejectors 140 would spray lubricant at the same time.

Solenoid valves 168 provide a reliable, effective way to control multiple manifold 110/ejector assemblies independently. In the embodiment of FIG. 8, the solenoids are consolidated with in junction box 170. The solenoids provide the signals to operate each of the solenoid valves 168. A junction box connector 172 is configured for connection to the electronic controller 240 which controls the solenoids within junction box 170.

Figure 9:
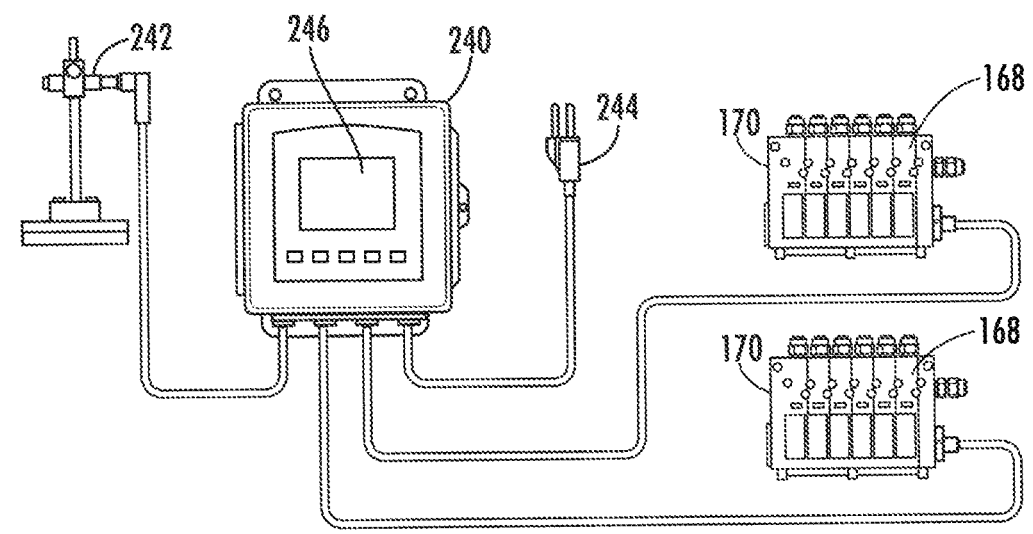
FIG. 9 is a schematic view of an electronic controller coupled to a plurality of solenoid valve actuators, in accordance with an embodiment of the invention.

FIG. 9 provides a schematic representation of the electronic controller 240 and its connection to multiple solenoid valve actuators 168. In the embodiment of FIG. 9, the electronic controller 240 has two connections to different banks of solenoid valves 168 via two different junction boxes 170. Additionally, the electronic controller 240 has a connection to a proximity sensor 242, which allows the electronic controller 240 to control various solenoid valve actuators 168 based on data received from the proximity sensor 242. A power cord 244 is provided to supply power to the electronic controller 240. In some embodiments, the electronic controller 240 is configured to control at least 16 different actuators and, thus, their respective ejectors 140. However, it is envisioned that electronic controllers 240 with any number of connections and the ability to control more than 16 actuators are within the scope of the present invention.

The electronic controller 240 may include a touch screen 246 or separate buttons, knobs, switched, dials, etc. that allow the user to interface with the electronic controller 240. In particular embodiments, the electronic controller 240 includes a counter (e.g., to count the number of operating cycles for a machine or piece of equipment) that allows the electronic controller 240 to activate one or more ejectors 140 to dispense lubricant on a particular operating cycle of the machine or piece of equipment. The electronic controller 240 may also include dedicated memory to store operating parameters for several dozen or up to one hundred or more programs to control operation of the lubricating system 100. In particular embodiments, the electronic controller 240 causes the ejector to dispense lubricant in rapid pulses to allow for lubrication of rapidly moving parts or equipment.

Figure 10:
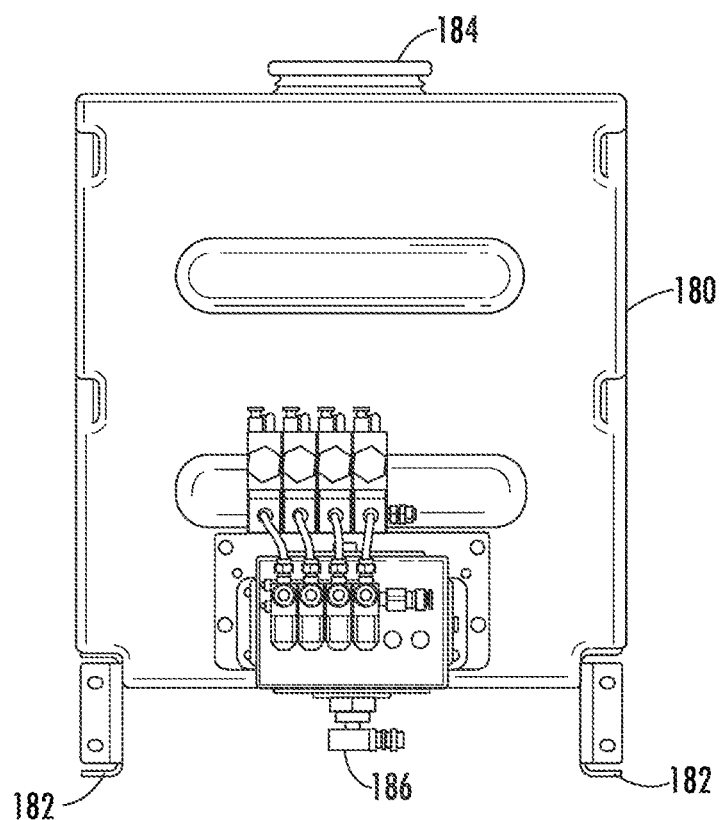
FIG. 10 is a plan view of a reservoir usable in the lubricating system of FIG. 1, in accordance with an embodiment of the invention.

FIG. 10 is a plan view of a reservoir 180 that stores lubricant and supplies that lubricant to multiple manifolds 110 and ejectors 140. Reservoirs 180 can be made in a variety of volumes and configurations depending upon the application. It is envisioned that reservoirs will typically range in volume from 2 quarts to 10 gallons, though reservoirs both larger than 10 gallons and smaller than 2 quarts are possible. The reservoir 180 may have legs 182 such that the reservoir 180 stands on the floor, cart, table, or shelf. In an alternate embodiment, the reservoir 180 is mounted to a wall or other vertical structure, using mechanical fasteners or even magnets. A covered inlet 184 at the top of the reservoir 180 allows for filling and re-filling with lubricant.

A reservoir outlet 186 at the bottom of the reservoir 180 supplies lubricant to the one or more manifolds 110 being fed by the reservoir 180. In particular embodiments, the reservoir outlet 186 is a quick-disconnect fitting that automatically closes upon removal of the fitting to which it is attached. The reservoir outlet 186 may connect to a hose or conduit that supplies the one or more manifolds 110. In certain embodiments, the quick-disconnect feature also allows for a quick connection. In a more particular embodiment, the quick disconnect fitting is a male fitting that automatically opens when a quick-disconnect female fitting is connected via simple insertion. The quick-disconnect feature is enacted by twisting one of the fittings (or for example twisting the reservoir 180) and separating the two fitting causing the reservoir outlet 186 to automatically close.

Figure 11:
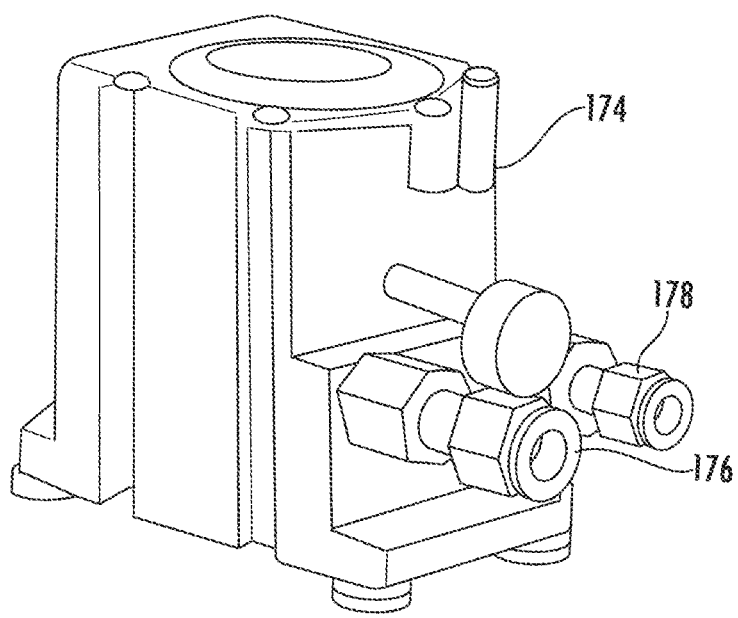
FIG. 11 is a perspective view of a pump used in the lubricating system of FIG. 1, in accordance with an embodiment of the invention.

Lubricant from the reservoirs 180 is gravity-fed to the one or more manifolds 110 used in the lubricating system 100. A panel of the reservoirs 180 may be transparent allowing the user to easily determine the level of lubricant and when refilling is required. However, larger reservoirs 180 may be expected to supply lubricant to a number of manifold 110/ejector 140 assemblies, some of which are located remotely from the reservoir 180. In these systems, the reservoir outlet 186 may be coupled to a pump 174 having an inlet 176 and an outlet 178, such as shown in FIG. 11, that boosts the flow rate of the lubricant to remote manifold 110/ejector 140 assemblies.

Figure 12:
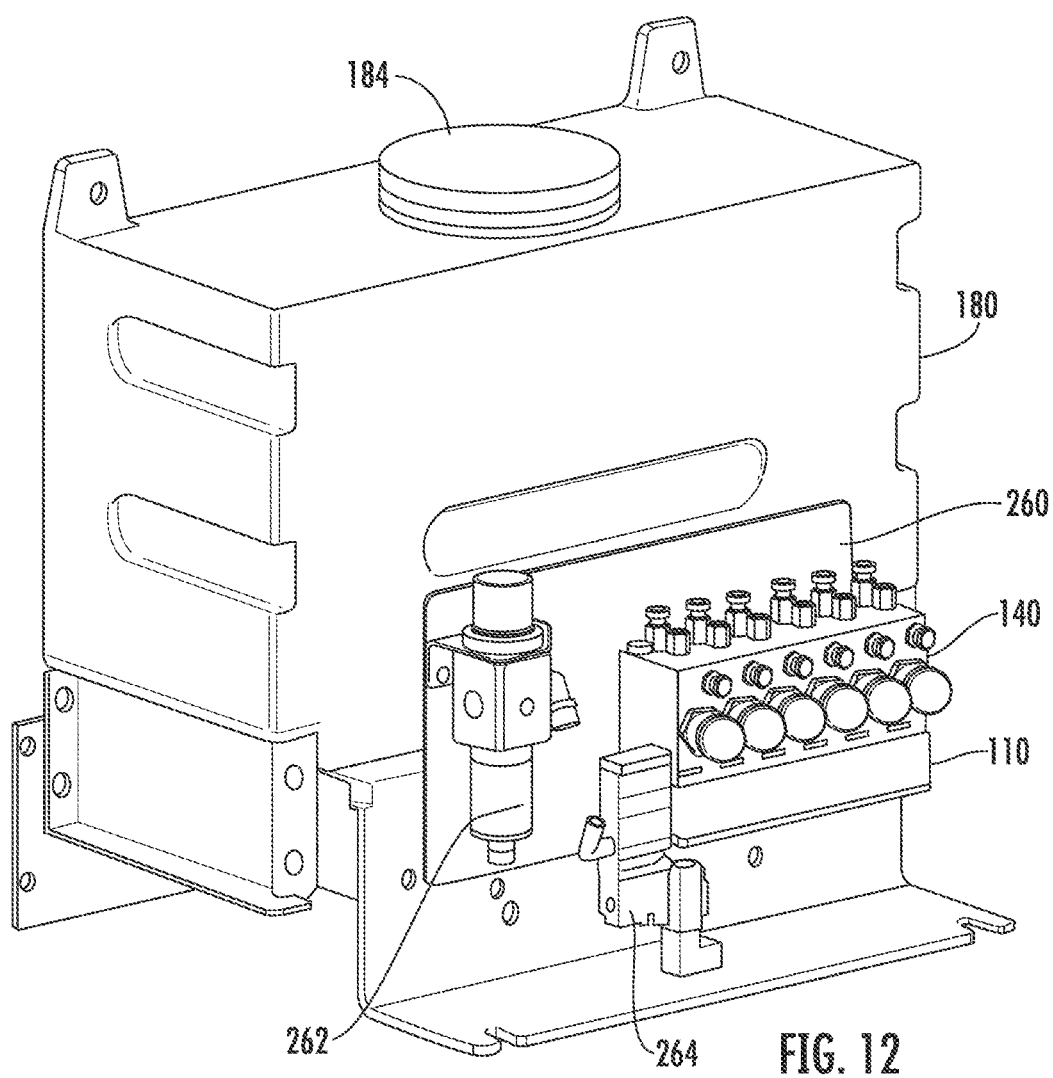
FIG. 12 is a perspective view of a frame assembled to a reservoir and supporting multiple manifolds and ejectors, in accordance with an embodiment of the invention.

To more easily install or remove multiple manifolds, ejectors, and actuators, a frame 260 may be used, as illustrated in FIGS. 12 and 13. In some embodiments, the frame 260 is designed for attachment to the reservoir 180, and for support of a plurality of manifolds 110 along with their respective ejectors 140. FIG. 12 illustrates such an embodiment. The six attached manifolds and six ejectors 140 are supported and attached to the frame 260, which also includes a filter regulator oiler (FRO) 262 to filter the compressed air being supplied to the bank of manifolds 110, regulate the air pressure and add lubricant for moving parts inside of the ejector 140. The FRO is coupled, typically via a short hose or conduit, to an actuator 264 which is coupled the bank of attached manifolds 110. In this arrangement with only one actuator 264, the ejectors 140 would all activate at the same time.

FIG. 13 is a perspective view of a frame 260 assembled to multiple solenoid valves 168, manifolds 110 and ejectors 140, in accordance with an embodiment of the invention. The bank of solenoid valves 168 is attached to junction box 170 which is attached directly to the frame 260. In this embodiment, each of the solenoid valves 168 is coupled via a short hose 268 to an air inlet port 266 on the front face of each of the bank of attached manifolds 110. The side air inlet ports 112 (see FIG. 2A) are covered with an airtight cover 270.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A lubricating system comprising:
a manifold having a manifold port that permits a flow of lubricant through the manifold, the manifold configured for removable attachment to another manifold such that any number of manifolds can be joined together;
an ejector removably attached to the manifold, the ejector having a projection configured for insertion into the manifold port, such that the ejector is configured to receive the flow of lubricant from the manifold, via the projection, and to periodically discharge lubricant from one or more outlet ports of the ejector; and
a locking key disposed between the manifold and ejector, the locking key configured such that movement of the locking key attaches or detaches the ejector from the manifold, wherein the manifold includes a key opening configured for insertion of the locking key and the projection includes a groove or notch and wherein a portion of the locking key is configured to fit within the groove or notch, to attach the ejector to the manifold, when the locking key is inserted into the key opening.

2. The lubricating system of claim 1, wherein the manifold includes a plurality of threaded and non-threaded openings for attachment to other manifolds.

3. The lubricating system of claim 1, further comprising a plurality of attached manifolds wherein each of the plurality of manifolds has a removably attached ejector.

4. The lubricating system of claim 3, wherein each of the plurality of attached manifolds is attached directly to an adjacent manifold in a side-by-side configuration.

5. The lubricating system of claim 3, wherein each of the plurality of attached manifolds is attached to an adjacent manifold via one or more tubes configured to facilitate movement of the lubricant or air between attached manifolds.

6. The lubricating system of claim 1, wherein the one or more outlet ports are each configured to connect to a nozzle, or to a hose that connects to the nozzle which is configured to dispense the lubricant.

7. The lubricating system of claim 1, wherein the ejector further includes a bleeder valve to bleed air from the ejector.

8. The lubricating system of claim 1, wherein the ejector further includes a volume control to increase or decrease an amount of lubricant discharged by the ejector.

9. The lubricating system of claim 1, wherein the ejector further includes a velocity control to increase or decrease a rate of lubricant flow from the ejector.

10. The lubricating system of claim 1, wherein the manifold includes an air inlet port configured to receive air to operate the ejector, and a fluid inlet port configured to receive lubricant to be supplied to the ejector.

11. The lubricating system of claim 10, further comprising an air valve for controlling a flow of pressurized air into the air inlet port of the manifold, and an actuator for operating the air valve.

12. The lubricating system of claim 11, wherein the actuator is a mechanical actuator or an electronic timer actuator.

13. The lubricating system of claim 10, further comprising a solenoid valve for controlling a flow of pressurized air into the air inlet port of the manifold.

14. The lubricating system of claim 1, further comprising a reservoir for the lubricant, the reservoir having a reservoir outlet from which lubricant is supplied to one or more manifolds.

15. The lubricating system of claim 14, wherein the reservoir outlet includes a male quick-disconnect coupling that automatically opens upon insertion into a mating female quick-disconnect coupling, and automatically seals upon removal from the mating female quick-disconnect coupling.

16. The lubricating system of claim 15, wherein the reservoir is configured for attachment to a frame designed to support one or more manifolds, their removably attached ejectors, and one or more solenoid valves.

17. The lubricating system of claim 15, wherein the frame includes the female quick-disconnect coupling and a conduit for carrying the lubricant from the female quick-disconnect coupling to the one or more manifolds supported by the frame.

18. The lubricating system of claim 14, further comprising a pump coupled between the reservoir and manifold, the pump configured to increase the flow rate of lubricant from the reservoir to the manifold.

19. The lubricating system of claim 1, further comprising an electronic controller configured to control an electronic timer actuator, or operation of a solenoid valve.

20. The lubricating system of claim 19, wherein the electronic controller is configured for connection to a proximity sensor wherein the electronic controller operates the solenoid valve based on data received from the proximity sensor.

21. The lubricating system of claim 19, wherein the electronic controller is configured to store, in memory, operating parameters for a plurality of different programs that control operation of the lubricating system.

22. The lubricating system of claim 19, wherein the electronic controller includes a counter which counts the number of operating cycles for a machine enabling the electronic controller to activate the ejector to dispense lubricant on a particular operating cycle of the machine.

* * * * *